(12) United States Patent
Hu et al.

(10) Patent No.: US 9,824,612 B2
(45) Date of Patent: Nov. 21, 2017

(54) DISPLAY PANEL WITH A TIMING CONTROL UNIT, METHOD FOR DRIVING THE SAME AND 3D DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Weihao Hu, Beijing (CN); Yoon Dae Keun, Beijing (CN); Yanping Liao, Beijing (CN); Yufan Du, Beijing (CN); Zongze He, Beijing (CN); Yangbing Yu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 115 days.

(21) Appl. No.: 14/316,198

(22) Filed: Jun. 26, 2014

(65) Prior Publication Data
US 2015/0279332 A1    Oct. 1, 2015

(30) Foreign Application Priority Data
Apr. 1, 2014    (CN) .......................... 2014 1 0129778

(51) Int. Cl.
*G09G 3/00* (2006.01)
*H04N 13/04* (2006.01)

(52) U.S. Cl.
CPC ....... *G09G 3/003* (2013.01); *G09G 2310/024* (2013.01); *G09G 2310/0221* (2013.01);
(Continued)

(58) Field of Classification Search
CPC ........ G09G 5/18; G09G 5/10; H04N 13/0438; H04N 13/0497
(Continued)

(56) References Cited

U.S. PATENT DOCUMENTS

| 6,774,868 B1 | 8/2004 | Bowen | |
| 2004/0114396 A1* | 6/2004 | Kobayashi | G02F 1/1336 362/561 |

(Continued)

FOREIGN PATENT DOCUMENTS

| CN | 1167965 A | 12/1997 |
| CN | 1955793 A | 5/2007 |

(Continued)

OTHER PUBLICATIONS

First Office Action for CN Application No. 201410129778.2, dated Jul. 30, 2015, 8 pages.
(Continued)

*Primary Examiner* — Lisa Landis
(74) *Attorney, Agent, or Firm* — Kinney & Lange, P.A.

(57) ABSTRACT

The disclosure provides a display panel, a method for driving the display panel and a 3D display device including the display panel, and relates to the technical field of display. The display panel comprises a display unit and at least one timing control units, wherein the display unit comprises a plurality of display regions and the plurality of display regions are simultaneously scanned. With the present invention, wire impedance in the display panel is reduced, charging time for a single row of pixels can be reduced and charging rate of the pixels can be improved.

9 Claims, 3 Drawing Sheets

(52) U.S. Cl.
CPC . *G09G 2320/0209* (2013.01); *H04N 13/0438* (2013.01); *H04N 13/0497* (2013.01)

(58) Field of Classification Search
USPC .......................................................... 345/213
See application file for complete search history.

(56) References Cited

U.S. PATENT DOCUMENTS

| | | | |
|---|---|---|---|
| 2005/0280894 | A1 | 12/2005 | Hartkop et al. |
| 2008/0001906 | A1* | 1/2008 | Wang .................... G09G 3/3413 345/102 |
| 2009/0058796 | A1 | 3/2009 | Shingai et al. |
| 2011/0292041 | A1* | 12/2011 | Lee ......................... G09G 3/342 345/419 |
| 2013/0100181 | A1* | 4/2013 | Choe .................... G03H 1/2294 345/691 |

FOREIGN PATENT DOCUMENTS

| | | |
|---|---|---|
| CN | 101802895 A | 8/2010 |
| CN | 102103839 A | 6/2011 |
| CN | 103065575 A | 4/2013 |
| CN | 203760055 U | 8/2014 |

OTHER PUBLICATIONS

Second Chinese Office Action dated Jan. 15, 2016, for corresponding Chinese Application No. 201410129778.2.
Third Chinese Office Action, for Chinese Patent Application No. 201410129778.2, dated Jun. 15, 2016, 13 pages.
Chinese Rejection Decision dated Dec. 27, 2016, for corresponding Chinese Application No. 201410129778.2.

\* cited by examiner

DISPLAY PANEL WITH A TIMING CONTROL UNIT, METHOD FOR DRIVING THE SAME AND 3D DISPLAY DEVICE

CROSS-REFERENCE TO RELATED APPLICATION

This application claims the benefit of Chinese Patent Application No. 201410129778.2 filed on Apr. 1, 2014 in the State Intellectual Property Office of China, the whole disclosure of which is incorporated herein by reference.

BACKGROUND OF THE INVENTION

Field of the Invention

Embodiments of the present invention relates to the technology field of display, and more particular, to a display panel, a method for driving the display panel and a 3D display device including the display panel.

Description of the Related Art

With the improvement of display technology, more and more 3D televisions having a 3-dimensional display effect are used in our daily lives. Correspondingly, demands for improvement of quality of the 3D televisions progressively increase.

In the existing television devices, the usually used 3D technique is generally classified into FPR (Film-type Patterned Retarder) technique (also called as polarization-type 3D technique) and SG (Shutter Glass) technique (also called as shutter-type 3D technique). Compared with a FPR type 3D display device, a SG-type 3D display device is used by more and more consumers, thanks to its advantages of less residual images, excellent 3D effect, full high definition 3D effect output, lower cost of screen and so on.

The SG 3D technique realizes the 3D effect mainly by changing refresh rates of pictures. Specifically, an image is divided into two parts according to frames so as to form two sub-images corresponding to left and right eyes of a user, respectively. The two sub-images are continuously and alternatively displayed. At the same time, switches for left and right eyeglasses of a SG 3D glasses worn by the user are synchronously controlled by using an infrared signal transmitter and the like, so that the left and right eyes of the user can see corresponding pictures thereof at exact timings. This technique can retain original resolutions of the pictures and can easily provide a real full high definition 3D effect for the user. Moreover, brightness of the pictures will not be reduced.

However, the SG 3D technique has the following defects. Specifically, the display panel using the SG 3D technique of the prior art typically performs scanning in a manner of row by row (i.e., line by line) and column by column. As shown in FIG. 1, in such display panel, a timing control circuit (T-CON) controls pixel units of the display panel to be switched on in a manner of column by column and row by row in the order of from left to right and from top to bottom (as indicated by arrows in FIG. 1). When such technique is applied to a large-size or super large-size display panel, such as a 2D large-size display panel or a large-size display panel using the SG 3D technique, since lengths of data lines and gate lines both are considerably increased, wire impedance of the lines and theoretical charging time for pixels also increase. Since a scanning frequency is unchanged, effective charging time for a single row of pixels is considerably reduced. As a result, brightness of pictures on the large-size display panel is low. In particular, for SG 3D display of pictures, not only brightness of SG 3D pictures is low, but also 3D crosstalk is large. Moreover, various problems involving in pictures may be caused due to insufficient charging rate.

SUMMARY OF THE INVENTION

In order to overcome the above mentioned and other technical problems in the prior art, embodiments of the present invention provide a display panel, a method for driving the display panel and a 3D display device including the display panel, which are capable of reducing wire impedance of lines in the display panel, reducing charging time for a single row of pixels and improving charging rate of the pixels.

According to embodiments of an aspect of the present invention, there is provided a display panel comprising a display unit and at least one timing control units, wherein the display unit comprises a plurality of display regions and the plurality of display regions are simultaneously scanned.

According to embodiments of another aspect of the present invention, there is provided a 3D display device comprising the display panel as described above.

According to embodiments of a further aspect of the present invention, there is provided a method for driving a display panel comprising a display unit and at least one timing control units, wherein the display unit comprises a plurality of display regions. The method comprises the step of simultaneously scanning the plurality of display regions of the display panel.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EMBODIMENTS

Figure 1:
FIG. 1 is a schematic view of scanning of a SG 3D display panel of the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
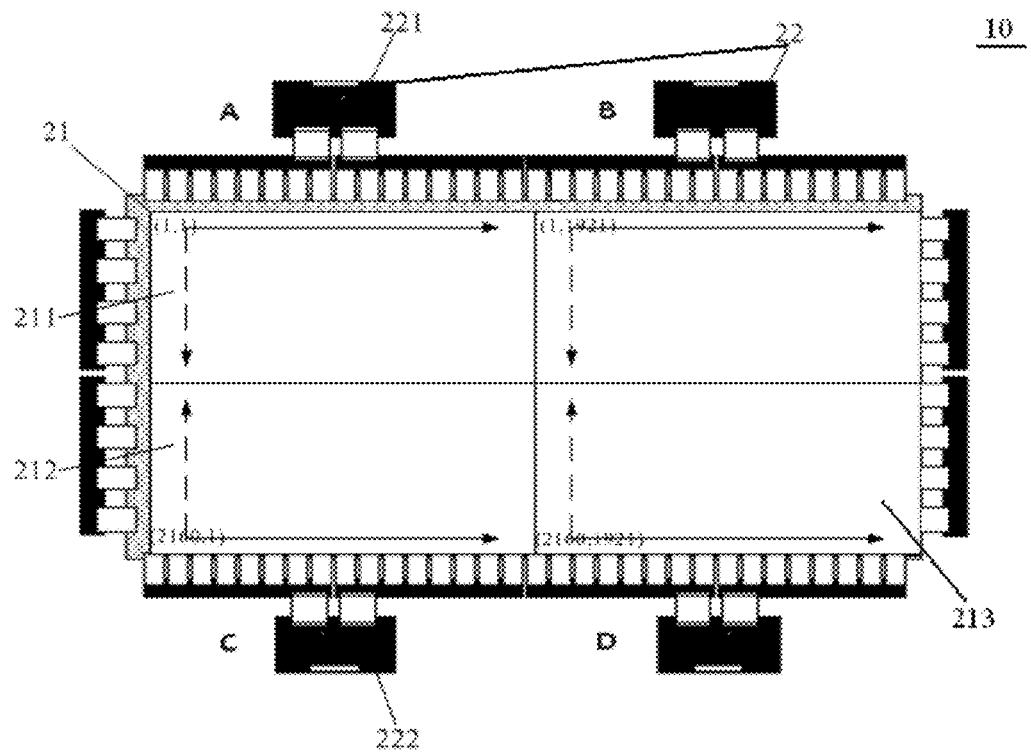
FIG. 2 is a schematic view of a structure of a display panel according to an embodiment of the present invention.

As shown in FIG. 2, a display panel 10 according to an embodiment of the present invention comprises a display unit 21 and at least one timing control unit 22. The display unit 21 comprises a plurality of display regions 211, 212, 213 . . . in which scanning is simultaneously carried out.

It should be noted that the display panel 10 may be provided with one timing control unit to control gate drivers and source drivers in each display region, respectively. However, it can be appreciated that in order to improve control precision, the display panel 10 may be alternatively provided with a plurality of timing control units. This is not specifically limited herein. The embodiments of the present invention are explained by taking the configuration of one timing control unit corresponding to one display region as an example, in which a first timing control unit 221 corresponds to a first display region 211 and a second timing control unit 222 corresponds to a second display region 212.

Specifically, in the first display region 211, the first timing control unit 221 is configured to control data lines by using a first source driver (not shown in Figs.) such that the data lines are scanned along a first direction, and to control gate lines by using a first gate driver (not shown in Figs.) such that the gate lines are scanned row by row along a second direction perpendicular to the first direction. In the second display region 212, the second timing control unit 222 is configured to control data lines by using a second source driver such that the data lines are scanned along the first direction, and to control gate lines by using a second gate driver such that the gate lines are scanned row by row along the second direction or a direction opposite to the second direction.

In an alternative embodiment, the first timing control unit 221 may control the data lines by using the first source driver such that the data lines are scanned along the second direction, and to control the gate lines by using the first gate driver such that the gate lines are scanned column by column along the first direction. In the second display region 212, the second timing control unit 222 may control the data lines by using the second source driver such that the data lines are scanned along the second direction or the direction opposite to the second direction, and to control the gate lines by using the second gate driver such that the gate lines are scanned column by column along the first direction.

It should be noted that the first and second directions usually indicate row and column directions of the display device, respectively. For instance, in the embodiment of the present invention shown in FIG. 2, the row direction of the display device is the first direction (as shown by solid lines in FIG. 2), and the column direction of the display device is the second direction (as shown by dashed lines which are along the column direction and extend from top to bottom in FIG. 2). However, the present invention is not limited to this. Which directions the first and second directions indicate may be selected according to actual requirements.

As shown in FIG. 2, the first display region 211 is adjacent to the second display region 212 along the second direction. After one frame has been scanned, the same number of rows of pixel units in the first display region 211 and the second display region 212 along the second direction are scanned. In the above alternative embodiment, after one frame has been scanned, the same number of columns of pixel units in the first display region 211 and the second display region 212 along the first direction are scanned.

In the embodiments of the present invention, the first display region 211 and the second display region 212 indicate any two display regions adjacent to each other along the second direction, instead of two specified display regions. It should be appreciated that when the display panel is divided into a plurality of display regions along the second direction, as shown in FIG. 2, each display region can be referred as the second display region with respect to the first display region upwardly adjacent thereto. Similarly, each display region can be referred as the first display region with respect to the second display region downwardly adjacent thereto.

In the display panel according to the embodiments of the present invention, the display unit is divided into a plurality of display regions, and thus the lines in the whole display panel are scanned in a segmented manner, so that the wire impedance can be effectively reduced and the charging rate can be increased. Furthermore, for the two display regions adjacent to each other along the second direction, they are scanned row by row or column by column along the second direction and the direction opposite to the second direction, respectively. In this way, the charging time for a single row of pixels is effectively reduced, so that the 3D display effect of the shutter-type 3D display device is remarkably improved.

Further, in the display panel according to the embodiments of the present invention, in the second display region, the timing control unit is preferably configured to control the data lines by using the second source driver such that the data lines are scanned along the first direction, and to control the gate lines by using the second gate driver such that the gate lines are scanned row by row along the direction opposite to the second direction. Alternatively, the timing control unit is configured to control the gate lines by using the second gate driver such that the gate lines are scanned row by row along the direction opposite to the second direction, and to control the data lines by using the second source driver such that the data lines are scanned along the first direction. In this way, as shown in FIG. 2, for the first and second display regions adjacent to each other along the second direction from top to bottom, the scanning mode of the display panel is changed from the mode in which the scanning is carried out from top to bottom, to the mode in which the scanning is carried out both from top to the center and from bottom to the center at the same moment, so that two adjacent rows of pixel units located at the positions where one display region is adjacent to another display region can be scanned at the same time. Thus, scanning time difference between the two adjacent rows of pixel units, formed when the conventional scanning mode in which the scanning is carried out from top to bottom is used, can be avoided, and the overall continuity of the pictures can be ensured, thereby further improving the display quality.

Further, since the liquid crystal display device itself cannot emit a light, a backlight module is usually provided at a side of the display unit of the liquid crystal display device, and the other side of the display unit is used as a display side. Accordingly, the display panel according to the embodiments of the present invention may further comprise a backlight module provided at a light entering side of the display unit and at least one backlight control unit. The backlight module comprises a plurality of light emitting regions.

Similar to the timing control unit, the backlight module may be provided with one backlight control unit to control light emitting in each light emitting region, respectively. However, the present invention is not limit to this. It can be appreciated that in order to improve control precision thereof, the backlight module may be provided with a plurality of backlight control units. The embodiment of the present invention is explained by taking the configuration of one backlight control unit corresponding to one light emitting region as an example, in which a first backlight control unit 321 corresponds to a first light emitting region 311 and a second backlight control unit 322 corresponds to a second light emitting region 312.

Figure 3:
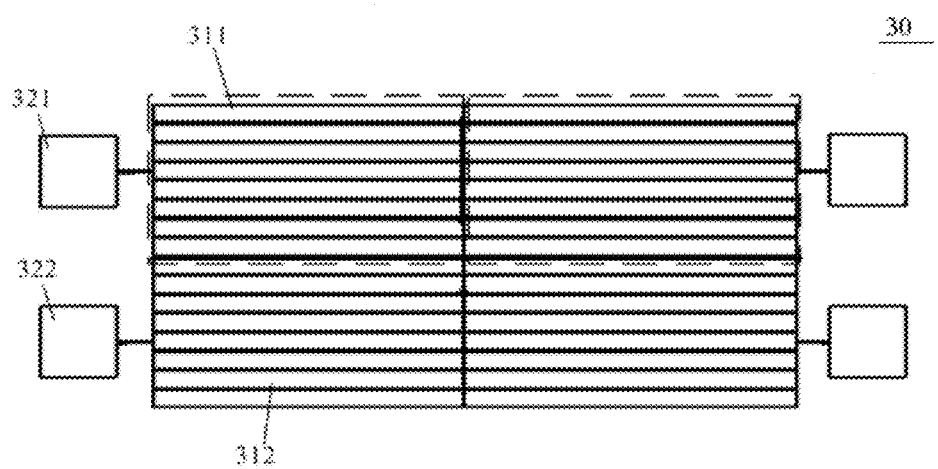
FIG. 3 is a schematic view of a structure of a backlight module according to an embodiment of the present invention.

In the embodiment of the present invention, the structure of the backlight module is shown in FIG. 3. The backlight module 30 may comprise a plurality of light emitting regions 311, 312 . . . , and each backlight control unit corresponds to one light emitting region.

In the first light emitting region 311, the first backlight control unit 321 is configured to switch on backlights row by row along the second direction. In the second light emitting region 312, the second backlight control unit 322 is configured to switch on backlights row by row along the second direction or the direction opposite to the second direction. The first and second light emitting regions 311 and 312 are adjacent to each other along the second direction.

In an alternative embodiment, in a case where in the first display region 211 the first timing control unit 221 controls the data lines by using the first source driver such that the data lines are scanned along the second direction, and to control the gate lines by using the first gate driver such that the gate lines are scanned column by column along the first direction, and in the second display region 212 the second timing control unit 222 controls the data lines by using the second source driver such that the data lines are scanned along the second direction or the direction opposite to the second direction, and to control the gate lines by using the second gate driver such that the gate lines are scanned column by column along the first direction, in first and second light emitting regions 311 and 312, the first and second backlight control units 321 and 322 are configured to switch on the backlights column by column along the first direction. The first and second light emitting regions 311 and 312 are adjacent to each other along the second direction.

It should be noted that the light emitting regions and the display regions may be in one-to-one correspondence. In one pair of the light emitting region and the display region corresponding to each other, the corresponding pixel unit and the corresponding backlight both are simultaneously turned on by synchronously scanning the backlight control unit and the timing control unit.

Specifically, the backlight module 30 may be divided into a plurality of light emitting regions having the same area, such as 8 light emitting regions having the same area. As shown in FIG. 3, each light emitting region may correspond to several rows or columns of pixel units. In this way, when one row or column of pixel units are scanned, the light emitting region corresponding the one row or column of pixel units may be controlled to be turned on. After all rows or columns of pixel units corresponding to this light emitting region have been scanned, or when all row or columns of pixel units corresponding to this light emitting region are in the dark state, this light emitting region can be turned off.

In this way, by means of cooperation of the driving operation of the backlight module with the driving operation of the display panel, the problem that the scanning operation of the backlight module is asynchronous with the display picture for the left and right eyes when the SG 3D display technique is applied to the large-size liquid crystal display panel, can be solved, and thus the 3D display effect is further improved.

In an embodiment, each display region may have the same shape and the same size, and each display region may have the same shape as that of the display unit. In an embodiment, the display unit may be evenly divided into 4 display regions having the same shape and the same size. In this way, by means of 4 separate timing control units having the same specification, the scanning mode of the display panel can be changed from the mode in which the scanning is carried out from top to bottom to the model in which the scanning is carried out both from top to the center and from bottom to the center. It should be noted that the above configuration is only an exemplary example and the present invention is not limited to this. It will be appreciated that as the size of the display panel is further increased, the display unit can be divided into more display regions, and this is not limited herein.

Another embodiment of the present invention also provides a 3D display device. The 3D display device comprises the above-described display panel. Since the structure of the display panel has previously been described in the foregoing embodiments in detail, the detailed description of the structure of the display panel is omitted herein.

It should be noted that the 3D display device according to the embodiment of the present invention may be any product or component having a display function, such as a liquid crystal display panel, an electric paper, a liquid crystal TV, a liquid crystal display, a digital picture frame, a cell phone, a flat computer and the like.

Specifically, the 3D display device may be a SG type 3D display device. The SG 3D technique realizes the 3D effect mainly by changing refresh rates of pictures. Specifically, an image is divided into two parts according to frames so as to form two sub-images corresponding to left and right eyes of a user, respectively. The two sub-images are continuously and alternatively displayed. At the same time, switches for left and right eyeglasses of a SG 3D glasses worn by the user are synchronously controlled by using an infrared signal transmitter and the like, so that the left and right eyes of the user can see corresponding pictures at an exact times.

Since the 3D display device according to the embodiment of the present invention comprises the display panel and the display unit of the display panel is divided into a plurality of display regions, the whole display panel is scanned in a segmented manner, so that the wire impedance can be effectively reduced and the charging rate can be increased. Furthermore, in a preferred embodiment, for the two display regions adjacent to each other along the second direction, they are scanned row by row or column by column along the second direction and the direction opposite to the second direction, respectively. In this way, the charging time for a single row or column of pixels is effectively reduced, so that the 3D display effect of the shutter-type 3D display device is remarkably improved.

The embodiment of the present invention also provides a method for driving the display panel as shown in FIG. 2. The display panel 10 comprises the display unit 21, and the display unit in turn comprises a plurality of display regions. The method comprises the step of simultaneously scanning the plurality of display regions of the display panel.

Figure 4:
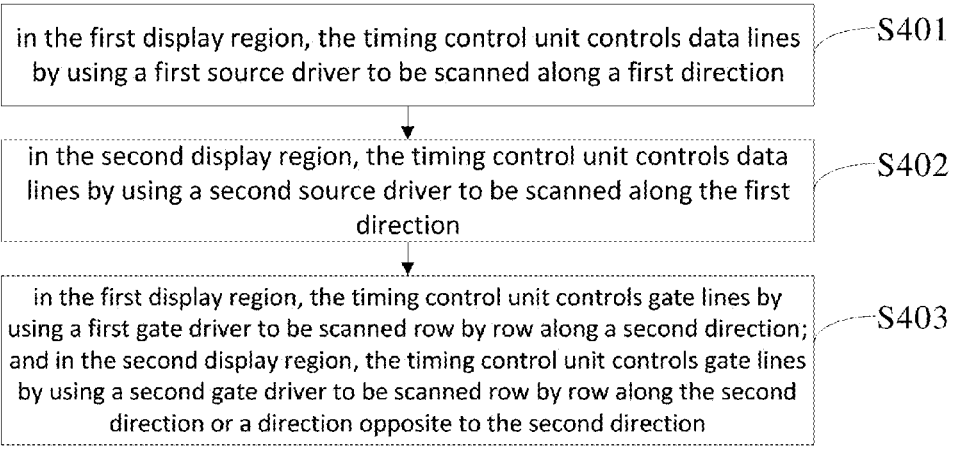
FIG. 4 is a schematic flow chart of a method for driving a display panel according to an embodiment of the present invention.

Specifically, as shown in FIG. 4, the step of simultaneously scanning the plurality of display regions of the display panel includes:

S401: in the first display region, the timing control unit controls the data lines by using the first source driver to be scanned along the first direction;

S402: in the second display region, the timing control unit controls the data lines by using the second source driver to be scanned along the first direction.

In the method for driving the display panel according to the embodiment of the present invention, S401 and S402 are not specified in a time sequence. For instance, S401 and S402 may be simultaneously carried out, and the present invention is not limited to this case.

S403: in the first display region, the timing control unit controls the gate lines by using the first gate driver to be scanned row by row along the second direction, and in the second display region, the timing control unit controls the gate lines by using the second gate driver to be scanned row by row along the second direction or the direction opposite to the second direction, until the displaying is completed.

Figure 5:
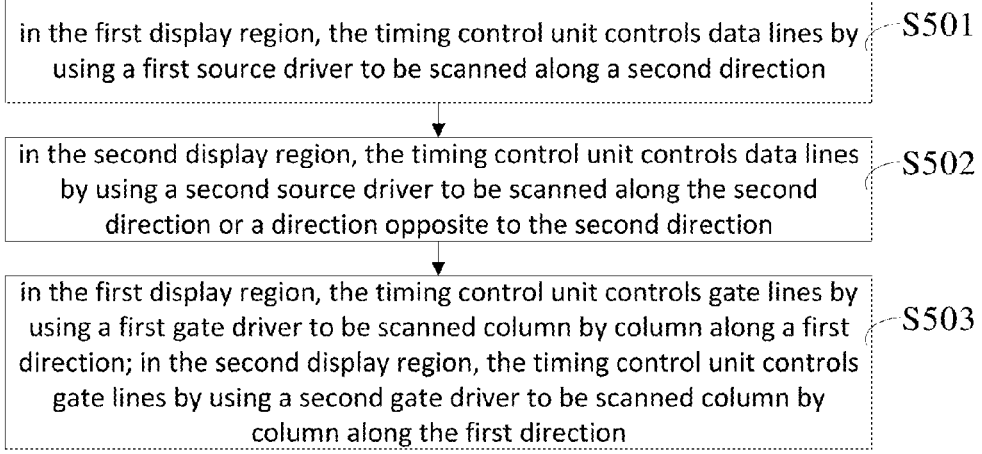
FIG. 5 is a schematic flow chart of a method for driving a display panel according to another embodiment of the present invention.

In an alternative embodiment, the method for driving the display panel is shown in FIG. 5 and comprises:

S501: in the first display region, the timing control unit controls the data lines by using the first source driver to be scanned along the second direction;

S502: in the second display region, the timing control unit controls the data lines by using the second source driver to be scanned along the second direction or the direction opposite to the second direction.

In the method for driving the display panel according to the alternative embodiment of the present invention, S501 and S502 are not specified in a time sequence. For instance, S501 and S502 may be simultaneously carried out and the present invention is not limited to this case.

S503: in the first display region, the timing control unit controls the gate lines by using the first gate driver to be scanned column by column along the first direction; and in the second display region, the timing control unit controls the gate lines by using the second gate driver to be scanned column by column along the first direction, until the displaying is completed.

It should be noted that the first and second directions usually indicate the row and column directions of the display device, respectively. For instance, in the embodiment of the present invention shown in FIG. 2, the row direction of the display device is the first direction (as shown by solid lines in FIG. 2), and the column direction of the display device is the second direction (as shown by dashed lines in FIG. 2). However, the present invention is not limited to this. Which directions the first and second directions indicate may be selected according to actual requirements.

The first display region is adjacent to the second display region along the second direction. After one frame has been scanned, the same number of rows of pixel units in the first display region and the second display region along the second direction are scanned. In an alternative embodiment, after one frame has been scanned, the same number of columns of pixel units in the first display region 211 and the second display region 212 along the first direction are scanned.

In the embodiment of the present invention, the first display region 211 and the second display region 212 indicate any two display regions adjacent to each other along the second direction, instead of two specified display regions. It should be appreciated that when the display panel is divided into a plurality of display regions along the second direction, as shown in FIG. 2, each display region can be referred as the second display region with respect to the first display region upwardly adjacent thereto. Similarly, each display region can be referred as the first display region with respect to the second display region downwardly adjacent thereto. By way of an example, when the display panel is divided into three display regions along the second direction, the upper display region can be referred as the first display region, the intermediate display region is considered as the second display region. If the intermediate display region is again referred as the first display region, the lower display region can be referred as the second display region. When the display panel is divided into a plurality of display regions along the second direction, those display regions can be referred in the same manner as described above.

In the method for driving the display panel according to the embodiment of the present invention, the display unit is divided into a plurality of display regions, and thus the whole display panel is scanned in a segmented manner, so that the wire impedance can be effectively reduced and the charging rate can be increased. Furthermore, in a preferred embodiment, for the two display regions adjacent to each other along the second direction, they are scanned row by row or column by column along the second direction and the direction opposite to the second direction, respectively. In this way, the charging time for a single row or column of pixels is effectively reduced, so that the 3D display effect of the shutter-type 3D display device is remarkably improved.

Further, in the display panel according to the embodiment of the present invention, in the second display region, the timing control unit is preferably configured to control the data lines by using the second source driver such that the data lines are scanned along the first direction, and to control the gate lines by using the second gate driver such that the gate lines are scanned row by row along the direction opposite to the second direction, or the timing control unit is preferably configured to control the gate lines by using the second gate driver such that the gate lines are scanned row by row along the direction opposite to the second direction, and to control the data lines by using the second source driver such that the data lines are scanned along the first direction. In this way, as shown in FIG. 2, for the first and second display regions adjacent to each other along the second direction from top to bottom, the scanning mode of the display panel is changed from the mode in which the scanning is carried out from top to bottom to the mode in which the scanning is carried out both from top to the center and from bottom to the center, so that two adjacent rows of pixel units located at the positions where one display region is adjacent to another display region can be scanned at the same time. Thus, scanning time difference between the two adjacent rows of pixel units, formed when the conventional scanning mode in which the scanning is carried out from top to bottom is used, can be avoided, and the overall continuity of the picture displaying can be ensured, thereby further improving the display quality.

Specifically, taken the display panel shown in FIG. 2 as an example, the display panel shown in FIG. 2 is UD (Ultra High Definition) display panel and usually its physical resolution can reach 3840×2160(4K×2K). The specific driving method is described as follows.

The display unit is evenly divided into four display regions. Four independent timing controller (T-CON) control a quarter of the display panel (correspondingly, the respective resolutions are 1920×1080). At the first moment of starting the driving operation, the four T-CONs start scanning from the respective first pixels, respectively, i.e., A T-CON(1, 1), B T-CON(1, 1921), C T-CON(2160, 1) and D T-CON(2160, 1921).

At the second moment, the T-CONs scan the respective second pixels, i.e., A T-CON(1, 2), B T-CON(2, 1922), C T-CON(2160, 2) and D T-CON(2160, 1922).

As such, according to the scanning path from left to right, the T-CONs drive the scanning operation for the respective regions, until the last column is scanned, i.e., A T-CON(1, 1920), B T-CON(1, 3840), C T-CON(2160, 1920) and D T-CON(2160, 3840). In this way, the scanning operation for a frame is completed.

After the operation of scanning one frame has been performed by carrying out the scanning column by column from left to right, the second frame in the respective regions is scanned in the mode in which the scanning is carried out both from top to the center and from bottom to the center. Specifically, at the first moment for scanning the second frame, the scanning is started from the pixel A T-CON(2, 1), B T-CON(2, 1921), C T-CON(2159, 1) and D T-CON(2159, 1921). The rest can be done in the same manner as described above, until the whole display unit is scanned.

Figure 6:
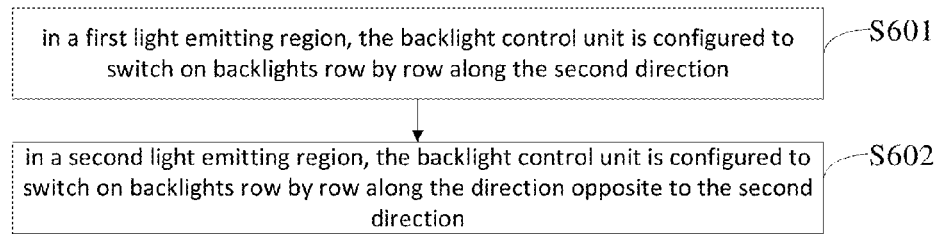
FIG. 6 is a schematic flow chart of a scanning method of a backlight module according to an embodiment of the present invention.

Further, the display panel also comprises a backlight module provided at a side, i.e., the light entering side, of the display unit. The backlight module comprises a plurality of light emitting regions. As shown in FIG. 6, the method further comprises:

S601: in the first light emitting region, switching on the backlights row by row along the second direction;

S602: in the second light emitting region, switching on the backlights row by row along the direction opposite to the second direction;

wherein the first and second light emitting regions are adjacent to each other along the second direction.

In the method for driving the display panel according to the embodiment of the present invention, S601 and S602 are not specified in a time sequence. For instance, S601 and S602 may be simultaneously carried out, and the present invention is not limited to this case.

In an alternative embodiment, in a case where the method for driving the display panel comprises S601, S602 and S603, the method for driving the display panel further comprises the step of:

S701: in first and second light emitting regions, switching on the backlights column by column along the first direction;

wherein the first and second light emitting regions are adjacent to each other along the second direction.

Further, the light emitting regions and the display regions may be in one-to-one correspondence. One pair of the light emitting region and the display region corresponding to each other can be synchronously scanned, so that the corresponding pixel unit and the corresponding backlight are simultaneously turned on at the same moment.

In an embodiment, the backlight module may be divided into a plurality of light emitting regions having the same area, such as 8 light emitting regions having the same area. As shown in FIG. 3, each light emitting region may correspond to several rows or columns of pixel units. In this way, when one row or column of pixel units are scanned, the light emitting region corresponding the one row or column of pixel units may be controlled to be turned on. After all rows or columns of pixel units corresponding to this light emitting region have been scanned, or when all row or columns of pixel units corresponding to this light emitting region are in the dark state, this light emitting region can be turned off.

In this way, by means of cooperation of the driving operation of the backlight module with the driving operation of the display panel, the problem that the backlight scanning operation is asynchronous with the displaying pictures for the user's left and right eyes when the SG 3D display technique is applied to the large-size liquid crystal display panel, can be solved, and thus the 3D display effect is further improved.

Further, in a preferred embodiment, the backlight scanning mode may be changed into the mode in which the scanning is carried out both from top to the center and from bottom to the center, so that the theoretical duration during which the backlight region is turned on can be doubled and thus the brightness is improved as a whole.

Specifically, the backlight region is divided in the same manner as the display panel is divided. For instance, four backlight driver are used for driving. At the moment when the first pixel is scanned, the display panel will send a synchronization signal BL_SYNC to the backlight control unit. When the backlight control unit received the synchronization signal, the backlight scanning is started and is carried out both from top to the centre and from bottom to the center. The region can be divided into several sub-regions for the backlight scanning. Usually, a single region is divided into eight sub-regions. However, the present invention is not limited to this. The region may be divided into more sub-regions, as along as the total scanning time for the (for example eight) sub-regions of the backlight module is equal to the scanning time for the display panel.

In the display panel having such structure, the display unit is divided into a plurality of display regions, and thus the whole display panel are scanned in a segmented manner, so that the wire impedance can be effectively reduced and the charging rate can be increased. Furthermore, with the above described driving method, the charging time for a single row or column of pixels is effectively reduced, so that the 3D display effect of the shutter-type 3D display device is remarkably improved.

It can be appreciated by one skilled in the art that all or parts of the processes embodying the above described method embodiments can be realized by hardware related with computer program instructions. The above described processes may be stored into a computer readable storage medium. When executed, the program carries out the respective steps including the above described embodiments. The computer readable storage medium may comprise various mediums which can store program codes, such as ROM, RAM, a magnetic disk, an optical disk and the like.

The above described embodiments are only used to explain the concept of invention of the present invention, and should not be regarded as a limit to the present invention. It would be appreciated by those skilled in the art that various changes and substitutions may be made without departing from the principle and spirit of the disclosure. Such changes and substitutions fall into the scope of the disclosure.

What is claimed is:

1. A display panel, comprising:
   a display unit; and
   at least one timing control unit;
   wherein the display unit comprises a plurality of display regions and the plurality of display regions are simultaneously scanned;
   wherein in the first display region, the timing control unit is configured to control data lines by using a first source driver to scan along one of a second direction and a third direction opposite to the second direction between a first edge of the first display region and a second edge of the first display region that abuts a second display region, and is configured to control gate lines by using a first gate driver to scan column by column along a first direction;

wherein in the second display region that is adjacent to the first display region along the second direction, the timing control unit is configured to control data lines by using a second source driver to scan along a same direction as that the first source driver scans along in the first display region between a first edge of the second display region and a second edge of the second display region that abuts the first display region, and is configured to control gate lines by using a second gate driver to scan column by column along the first direction;

wherein the timing control unit is configured to operate such that after one frame has been scanned, the same number of columns of pixel units in the first display region and the second display region along the first direction are scanned; and wherein the first direction is a row direction of the display panel, and the second direction is a column direction of the display panel.

2. The display panel according to claim 1, wherein
the display panel further comprises a backlight module provided at a light entering side of the display unit and at least one backlight control units;
the backlight module comprises a plurality of light emitting regions;
in first and second light emitting regions, the backlight control unit is configured to switch on backlights column by column along the first direction; and
wherein the first and second light emitting regions are adjacent to each other along the second direction.

3. The display panel according to claim 2, wherein
the light emitting regions and the display regions are in one-to-one correspondence; and
in one pair of the light emitting region and the display region corresponding to each other, the backlight control unit and the timing control unit synchronously scan, so that the corresponding pixel unit and the corresponding backlights are simultaneously turned on.

4. The display panel according to claim 1, wherein the display regions have the same shape and the same size, and each display region has the same shape as that of the display unit.

5. A 3D display device, comprising a display panel according to claim 1.

6. The 3D display device according to claim 5, wherein
the display panel further comprises a backlight module provided at a light entering side of the display unit and at least one backlight control unit;
the backlight module comprises a plurality of light emitting regions;
in first and second light emitting regions, the backlight control unit is configured to switch on backlights column by column along the first direction; and wherein the first and second light emitting regions are adjacent to each other along the second direction.

7. A method for driving a display panel comprising a display unit and at least one timing control unit, wherein the display unit comprises a plurality of display regions, and the method comprises the step of:
simultaneously scanning the plurality of display regions of the display panel, including:
in the first display region, controlling data lines with the timing control unit by using a first source driver to scan along one of a second direction and a third direction opposite to the second direction between from a first edge of the first display region and a second edge of the first display region that abuts a second display region, and controlling gate lines with the timing control unit by using a first gate driver to scan column by column along a first direction;
in the second display region that is adjacent to the first display region along the second direction, controlling data lines with the timing control unit by using a second source driver to scan along a same direction as that the first source driver scans along in the first display region between a first edge of the second display region and a second edge of the second display region that abuts the first display region, and controlling gate lines with the timing control unit by using a second gate driver to scan column by column along the first direction;
wherein after one frame has been scanned, the same number of columns of pixel units in the first display region and the second display region along the first direction are scanned; and
wherein the first direction is a row direction of the display panel, and the second direction is a column direction of the display panel.

8. The method for driving the display panel according to claim 7, wherein the display panel further comprises a backlight module provided at a light entering side of the display unit; the backlight module comprises a plurality of light emitting regions; and the method further comprising the step of:
in first and second light emitting regions, switching on backlights column by column along the first direction;
wherein the first and second light emitting regions are adjacent to each other along the second direction.

9. The method for driving the display panel according to claim 8, wherein the light emitting regions and the display regions are in one-to-one correspondence; and the method further comprises:
synchronously scanning one pair of the light emitting region and the display region corresponding to each other, so that the corresponding pixel unit and the corresponding backlights are simultaneously turned on.

* * * * *